United States Patent [19]

Fletcher et al.

[11] 4,033,504

[45] July 5, 1977

[54] BIMETALLIC JUNCTIONS

[76] Inventors: James C. Fletcher, Administrator of the National Aeronautics and Space Administration, with respect to an invention of; Frank G. Arcella; Gerald G. Lessmann, both of Pittsburgh, Pa.; Russell A. Lindberg, Westlake, Ohio

[22] Filed: Oct. 24, 1975

[21] Appl. No.: 625,733

[52] U.S. Cl. .............................. 228/190; 228/194; 228/232

[51] Int. Cl.² .................. B23K 15/00; B23K 19/00

[58] Field of Search .......... 228/189, 190, 193, 194, 228/195, 232

[56] References Cited

UNITED STATES PATENTS

| 3,105,292 | 10/1963 | Jeune | 228/232 X |
|---|---|---|---|
| 3,560,700 | 2/1971 | Staffort et al. | 219/121 EM |
| 3,646,591 | 2/1972 | Thomas et al. | 228/263 X |
| 3,680,197 | 8/1972 | Blum et al. | 228/193 |
| 3,696,499 | 10/1972 | Dromsky | 228/232 X |
| 3,714,702 | 2/1973 | Hammond | 228/193 X |
| 3,740,828 | 6/1973 | Buchinski et al. | 228/263 X |
| 3,794,807 | 2/1974 | Bailey et al. | 219/121 EM |

*Primary Examiner*—Al Lawrence Smith
*Assistant Examiner*—K. J. Ramsey
*Attorney, Agent, or Firm*—N. T. Musial; G. E. Shook; John R. Manning

[57] ABSTRACT

The formation of voids through interdiffusion in bimetallic welded structures exposed to high operating temperatures is inhibited by utilizing an alloy of the parent materials in the junction of the parent materials or by preannealing the junction at an ultrahigh temperature. These methods are also used to reduce the concentration gradient of a hardening agent.

4 Claims, 2 Drawing Figures

BIMETALLIC JUNCTIONS

ORIGIN OF THE INVENTION

The invention described herein was made in the performance of work under a NASA contract and is subject to the provisions of Section 305 of the National Aeronautics and Space Act of 1958, Public Law 85–568 (72 Statute 435; 42 USC 2457).

BACKGROUND OF THE INVENTION

This invention is concerned with joining either dissimilar metallic materials, or alloys containing hardening materials, such as carbides, nitrides and intermetallic compounds. The invention is particularly directed to reducing the coalescence and growth of voids in the lower melting point material of two metallurgically joined materials having widely differing melting points. The invention is further concerned with preventing a serious depletion of a hardening agent due to a high concentration gradient resulting from the joining process.

Dissimilar metallic materials can be joined by a number of different methods, such as pressure welding, electron beam welding, and laser beam welding. These metallurgically joined materials interdiffuse when used at elevated temperatures. The interdiffusion is uneven because the atoms of the lower melting point metal possess a higher mobility and diffuse across the junction more rapidly than those atoms of the higher melting point metal moving in the opposite direction. This net flux of low melting point metal atoms across the junction is compensated by a flux of vacancies in the opposite direction. These vacancies coalesce adjacent to the junction in the lower melting point metal. This phenomenon is commonly referred to as the Kirkendall Effect.

Long diffusion thermal aging inherent in various applications of the dissimilar metal junctions can result in the coalescence of these voids into an interconnecting structure. Thus the vacuum and structural integrity of the junction, as well as its employment as a seal, can be compromised.

A problem encountered in employing dissimilar metal junctions of materials whose selection is dictated by other considerations, such as the requirements of thermionic power systems, is to prevent or inhibit the gross growth of Kirkendall voids and reduce the concentration gradient of key hardening compounds. This leads to longer life at elevated temperatures under stress conditions which is important when system lifetimes are expected to exceed three to four years without material compromise.

In the employment of dissimilar metal joints at thermionic power conversion temperatures, the Kirkendall voids become interconnecting after long periods of diffusion time. These voids form paths that lead to junction through leakage. Thus vacuum or cesium plasma envelopes in thermionic systems become compromised. Also the plane of Kirkendall voids is known to fracture easily because of its porous structure. Inasmuch as the gross formation of Kirkendall voids forms in this plane, the cross-sectional area for thermionic current is reduced. This produces $I^2 R$ losses and localized heating.

The prior art has been directed toward inhibiting or retarding the interdiffusion of the parent materials by placing a layer of a third material between them as a barrier. It is generally accepted that the melting point of the selected barrier is important because the higher it is the lower the extent of interdiffusion. Such barrier layers may reduce but do not solve the void problem. By way of example, if tungsten is coupled to columbium, no barrier of higher melting point metal exists. Also, coupling of tungsten to columbium will still result in considerable Kirkendall void formation after brief aging of 100 to 500 hours at elevated temperatures. In some applications, such as thermionic power systems, a barrier layer of a third material cannot be used.

Another problem is encountered in the case of loss of strength or the rupture of a joint of two alloys which have incorporated a filler metal. The formation of the joint produces a severe concentration gradient of the hardening agents. The filler metal will generally have an absence of these hardening agents. Consequently, a reduction of this severe concentration gradient by methods employed for the Kirkendall effect will extend the life times of such joints under stress and at elevated temperatures.

SUMMARY OF THE INVENTION

The present invention is directed to several methods for inhibiting the formation of Kirkendall voids or reducing the concentration gradient of a hardening agent. One technique includes the introduction of interdictory common alloy layers between the joined materials. Another method comprises subjecting the as-joined materials to a short elevated temperature preanneal prior to juncture employment.

OBJECTS OF THE INVENTION

It is, therefore, an object of the present invention to reduce the coalescence and growth of Kirkendall voids over that which would normally occur during the same time-temperature conditions in conventionally joined junctions.

Another object of the invention is to inhibit intervoid porosity and through leakage from occurring in metallic junctions that are particularly susceptible to such degradation.

A further object of the invention is to reduce the concentration gradient of a hardening agent at a junction of two alloys having a filler metal.

These and other objects of the invention will be apparent from the specification which follows and from the drawings wherein like numerals are used throughout to identify like parts.

DESCRIPTION OF THE PREFERRED EMBODIMENT

Figure 1:
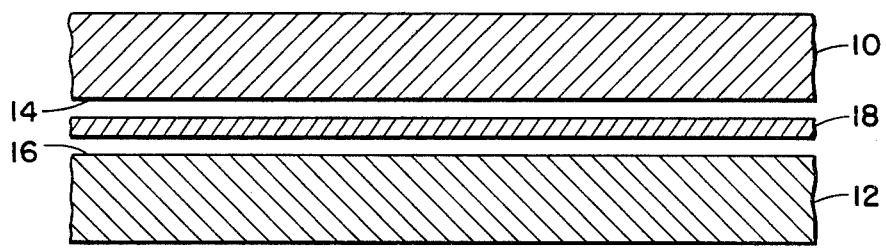
FIG. 1 is a vertical sectional view illustrating the manner in which two dissimilar metallic materials are metallurgically joined in accordance with the preferred embodiment of the invention.

Referring now to the drawing, there is shown in FIG. 1 a plate 10 which is to be metallurgically joined to member 12. The plate 10 may be a high temperature metal, such as tungsten. If, for example, the member 12 is columbium, no barrier of a higher melting point exists. Also, direct coupling of tungsten to columbium will result in considerable Kirkendall void formation after brief ageing at elevated temperatures.

The plate 10 has a surface 14 which faces a similar surface 16 on the member 12. Both of these surfaces are substantially flat and clean.

According to the present invention, an intermediate layer 18 is positioned between the facing surfaces 14 and 16 prior to metallurgically joining the plates 10 to the member 12. The layer 18 comprises an alloy of the material of the plate 10 as well as the material of the member 12.

In the preferred embodiment shown in FIG. 1 the layer 18 is a material homogeneously composed of 50% of the material of the plate 10 and 50% of the material of the member 12. The layer 18 is 50W-50Cb when a plate 18 of tungsten is joined to a columbium member 20.

After the layer 18 is positioned between the surfaces 14 and 16 as shown in FIG. 1, the plate 10 and member 12 are metallurgically joined by welding. This may be by pressure welding or by electron beam welding.

A resulting artificial interdiffusion zone forms a shallow concentration gradient to subsequent interdiffusion. Of particular importance is the fact that the artificial interdiffusion zone is free of Kirkendall voids at the start of the interdiffusion process. Thus the initiation and development of Kirkendall voids will form at a reduced rate because the rate of interdiffusion has been reduced by the void free Kirkendall void inhibition layer 18.

Often in thermionic power systems, the two metals to be joined are selected for therionic emission and high temperature strength characteristics. No consideration is given with respect to inhibiting the Kirkendall effect. By way of example, the plate 10 in FIG. 1 may be an emitter material of CVD-tungsten or rhenium while the member 12 is a structural material. Here again, the layer 18 is an alloy of about 50% by weight of each of the materials of the plate 10 and the member 12.

DESCRIPTION OF ALTERNATE EMBODIMENTS

Figure 2:
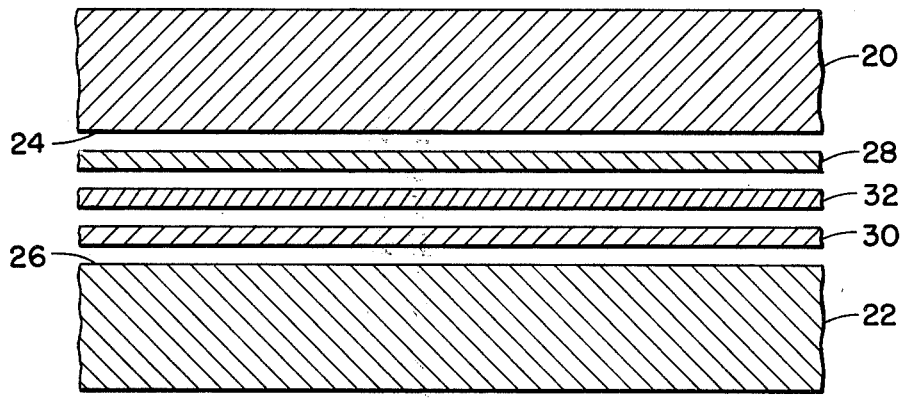
FIG. 2 is a vertical sectional view illustrating an alternate embodiment of the invention.

Referring now to FIG. 2, there is shown a plate 20 which is similar to the plate 10 shown in FIG. 1. A member 22 is similar to the member 12 shown in FIG. 1. The plate 20 has a surface 24 which faces a corresponding surface 26 on the member 22.

In accordance with this embodiment of the invention, three intermediate layers 28, 30 and 32 are positioned between the plate 20 and the member 22 prior to metallurgically joining them. Each of the intermediate layers comprises an alloy of the materials of the plate 20 and member 22. Each of the layers 28, 30 and 32 is from a special melt.

The layer 28 is preferably comprised of an alloy of 75% by weight of the material in the plate 20 and 25% by weight of the material in the member 22. This intermediate layer 28 is adjacent to the surface 24, as shown in FIG. 2.

The layer 30 is preferably an alloy of 75% by weight of the material of the member 22 and 25% by weight of the material of the plate 20. This layer 30 is positioned adjacent to the surface 26.

The third intermediate layer 32 preferably comprises an alloy of about 50% of each of the materials of plate 20 and member 22. The layer 32 of FIG. 2 is similar to the layer 18 of FIG. 1 and is positioned between the intermediate layers 28 and 30.

After the layers are arranged as shown in FIG. 2, the plate 20 and member 22 are metallurgically joined in the manner described in FIG. 1. More particularly, the plates are welded through the intermediate layers 28, 30 and 32 by pressure welding or electron beam welding.

While each layer 28, 30 and 32 is from a special melt it will be appreciated that one or more of these layers may be commercially available as an industrial alloy of the two components of the junction. In the case where the plate 20 is tungsten and the member 22 is rhenium, the intermediate layer 28 is a commercially available alloy, W – 25 Re.

The Kirkendall void inhibition layers 18, 28, 30 and 32 may be formed separately and applied to the junction during metallurgical joining, such as hot isostatic pressure welding. These layers may also be formed during joining, as with a wide puddle during electron beam welding.

Kirkendall void inhibition layers may also be formed through short, elevated temperature anneals. More particularly, the as-joined materials are subjected to the short preanneal at a temperature above about 0.9 melting temperature prior to juncture employment. This is based on the fact that at elevated temperatures the vacancy arrival rate at the sink area is exceeded by the natural vacancy removal mechanisms, such as grain boundaries, dislocations, and bulk diffusion, which adequately removes these vacancies without their precipitating. Thus the ultra-high temperature anneals which enhance these removal mechanisms will result in an accelerated establishment of void free concentration profiles. Subsequent long time employment at reduced temperatures will result in minimal or reduced interdiffusion and the reduction or complete absence of the void structure, even though the normal vacancy removal rates are now much reduced.

In another embodiment the plates 10 and 20 and the members 12 and 22 are of alloys which incorporate a filler metal, such as nickel. The formation of the joint produces a severe concentration gradient of the hardening agents, such as carbides, nitrides, and/or intermetallic compounds.

These concentration gradients can be reduced by utilizing the aforementioned joining procedures. This will extend the life times of such joints under stress at elevated temperatures. A specific illustration of the beneficial technical effect is utilizing the methods employed for the Kirkendall effect to join a typical superalloy or maraging steel to a stainless steel alloy, such as type 304 by using a nickel filler.

While several embodiments of the invention have been shown and described, it will be appreciated that various modifications of the disclosed process may be made without departing from the spirit of the invention or the scope of the subjoined claims. By way of example, the Kirkendall void inhibition techniques described above are mechanistic in nature and are applicable to any metallurgical juncture wherein Kirkendall voids and gradients would occur through natural interdiffusion.

1. In a method of metallurgically joining dissimilar metallic materials which have widely differing melting points and interdiffused or form concentration gradients at elevated temperatures, the improvement comprising separately forming at least one alloy layer homogeneously composed of the two dissimilar metallic materials,
positioning said alloy layer between said dissimilar metallic materials, and welding said two dissimilar metallic materials together whereby said alloy layer forms a dissimilar metal junction.

2. A method of metallurgically joining dissimilar metallic materials as claimed in claim 1 wherein said alloy layer comprises about 50% by weight of each of said dissimilar metallic materials.

3. A method of metallurgically joining dissimilar metallic materials as claimed in claim 1 including the steps of separately forming a plurality of intermediate alloy layers, each of said intermediate alloy layers consisting essentially of an alloy of the two dissimilar metallic materials, and positioning said alloy layers between the dissimilar materials prior to joining.

4. A method of metallurgically joining dissimilar metallic materials as claimed in claim 3 including a first intermediate alloy layer comprising about 25% by weight of one of said dissimilar metallic materials and about 75% by weight of the other of said dissimilar metallic materials adjacent to said other of said dissimilar metallic materials.

a second intermediate alloy layer comprising about 75% of said one dissimilar metallic material and about 25% of said other of said dissimilar metallic materials positioned adjacent to said one dissimilar metallic material, and a third intermediate alloy layer comprising about 50% of said one dissimilar metallic material and about 50% of the other of said dissimilar metallic material positioned between said first and second intermediate layers.

* * * * *